May 8, 1962 D. F. MELTON ET AL 3,033,059

DRIVE MEANS FOR REMOTE CONTROL MANIPULATOR

Filed Sept. 19, 1958 2 Sheets-Sheet 1

INVENTOR.
DONALD F. MELTON
THOMAS R. JAMES
BY Robert E. Homer
ATTORNEY

DRIVE MEANS FOR REMOTE CONTROL MANIPULATOR
Filed Sept. 19, 1958
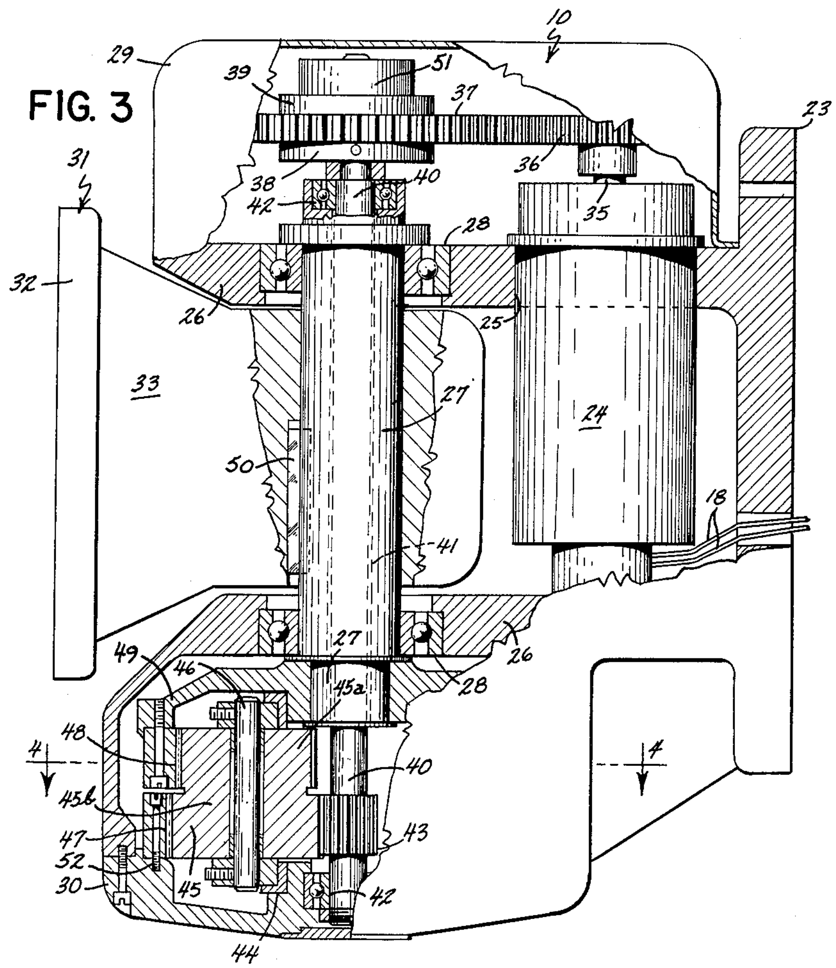
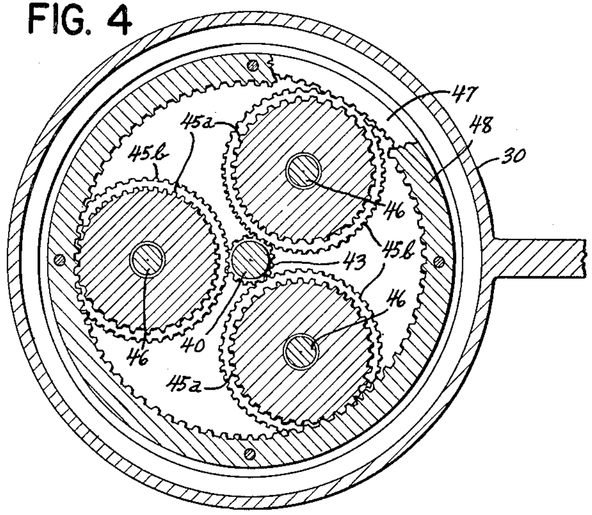
INVENTOR.
DONALD F. MELTON
THOMAS R. JAMES
BY Robert E. Horne
ATTORNEY United States Patent Office 3,033,059

Patented May 8, 1962

3,033,059

DRIVE MEANS FOR REMOTE CONTROL MANIPULATOR

Donald F. Melton, Minneapolis, and Thomas R. James, St. Paul, Minn., assignors to General Mills, Inc., a corporation of Delaware Filed Sept. 19, 1958, Ser. No. 762,144
4 Claims. (Cl. 74—801)

This invention relates to remote control manipulators and the like, and more particularly to an improved differential speed reducer arrangement for causing relative swinging movement of a pivoted arm member.

Differential speed reducers employing self-centering planetary gears engaging internally toothed ring gears are well known in the art. The planetary gears of such a differential speed reducer include two gear portions which engage two respective ring gears with slightly different effective gear ratios. The first gear portion is engageable with a sun gear and the second gear portion has a lesser diameter and/or a lesser number of teeth than said first gear portion. It is this difference in diameter or number of teeth that produces a differential action and resultant speed reduction when the planetary gears are meshed with known ring gears. By way of example, a differential speed reducer may reduce a 2000 r.p.m. input shaft speed to 1 r.p.m. at the output shaft of the differential speed reducer.

In many applications it is desirable to use a high speed motor (for example, 6000 r.p.m.) to provide higher horsepower and yet occupy a smaller space than a motor of equivalent horsepower and operating at a lower speed (for example, 1750 r.p.m.).

We have found it desirable in the design of a remotely controlled manipulator arm to employ high speed motors for the actuation of the various components of a manipulator. As manipulators are often operated from a single supporting location, it is desirable to provide components along the manipulator arm having a minimum bulk to achieve maximum load carrying possibilities with the manipulator, and yet maintain the requisite versatility of the manipulator.

It is also desirable in manipulator construction to achieve compactness in design. Compactness primarily relates to having minimum cross-sectional areas for the manipulator, to increase its ability to operate in confined areas with a minimum obstruction of operator visibility.

Specifically, we have found it desirable to use a differential speed reducer in combination with a high speed motor to constitute the driving means at a shoulder or pivoted joint of a manipulator. Such shoulder or pivoted joint may cojoin two rotating portions of a manipulator arm; an extensible portion and a rotating portion; or two non-rotatable portions or a non-rotatable portion in combination with a non-extensible portion.

Relative to the compactness mentioned hereinabove, we have found that a differential speed reducer can be so arranged that the output shaft (i.e. lower speed shaft) of the differential speed reducer serves as the axis and driving member for the pivoted joint or shoulder of a manipulator arm.

Further, in our preferred embodiment we have located the motor drive means and differential speed reducer in the shoulder or pivoted joint of a manipulator arm. With the motor and reducer so located, we have determined that the output shaft of the differential speed reducer can serve as the axis and driving member of the pivoted joint. Then by providing the output shaft with a bore, we are able to pass the input shaft therethrough. With the input and output shafts coaxially located we have determined that compactness at the joint is obtained by housing the gear drive of the input shaft on one side of the pivoted joint and by enclosing the differential speed reducer in a housing at the opposite end of the input shaft.

The pivoted joint or shoulder comprises two main portions:

(1) The portion containing the motor and speed reducer being designated as the drive portion, and (2) A pivoted member or a member connected to the output shaft of the speed reducer and rotated thereby, which is the driven portion.

In operation, with the drive portion fixed, it is the driven portion that is pivoted. If, however, the driven portion is fixed then the drive portion pivots. In each case the output shaft of the speed reducer serves as the pivotal axis and driving member for the pivoted joint.

It is, therefore, an object of our invention to provide a differential speed reducer wherein the output shaft of said reducer serves as the pivotal axis and driving member of a shoulder or pivoted joint.

Another object of our invention is to provide a differential speed reducer wherein the input shaft and output shaft are concentric, one within the other.

A further object of our invention is to provide differential speed reducer as a driving means at a pivoted joint.

Another object of our invention is to provide a compact driving means at a shoulder or pivoted joint wherein the input shaft drive means and differential speed reducer means are located on opposite ends of the coaxial input-output shafts.

These and other objects will be apparent from the following specification and it will be understood that this disclosure is illustrative and not limitative of the invention which is as defined by the appended claims.

In the accompanying drawings:

FIG. 3 is a partial sectional view of the differential speed reducer drive with coaxial input and output shafts; and FIG. 4 is a sectional view taken at 4—4 of FIG. 3.

Figure 1:
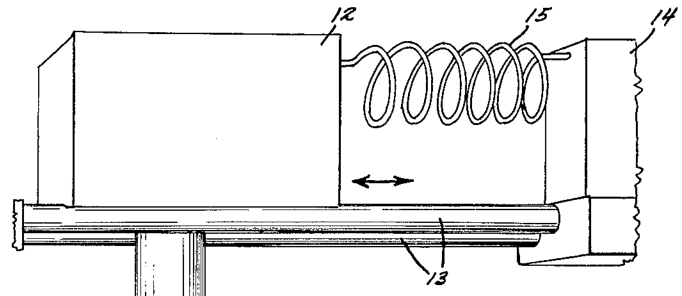
FIGURE 1 is a perspective view of a manipulator arm.
Figure 1:
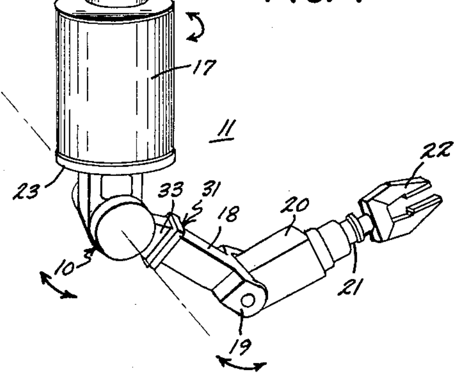

Referring now to FIG. 1 a manipulator 11 is shown having a pivoted joint or shoulder 10. The functional details of manipulator 11 are not set out, for the manipulator 11 is to provide an embodiment for illustrating the action of the pivoted joint or shoulder 10 in a manipulator.

The various movements of a remote control manipulator have been previously obtained in a known manner by means of motors and connections and control circuits as shown, for example, in the co-pending application of Thomas R. James, Serial No. 243,705, filed August 25, 1951, now Patent No. 2,861,700, which is assigned to the assignee of the present invention.

Manipulator 11 is supported by a main supporting unit 12 movably mounted on support rods 13. Power for the manipulator is provided by power supply 14 through cable 15 to the various energizing means (not shown) located within manipulator 11 for producing movements set out in the above James application. The main portions of manipulator 11 are as follows: extensible-contractible (telescopic) portion 16; rotatable connecting unit 17, shoulder 10 (which will be described hereinafter in detail); upper arm 18; elbow 19; forearm 20, wrist 21; and gripping fingers or hand 22. As examples of manipulator motion, the manipulator 11 may be operated to extend or retract the telescopic portion 16 which is supported by unit 12 which may be positioned along rods 13; rotatable unit 17 may swing the remainder of the manipulator about an axis passing through the shoulder 10, unit 17, and portion 16. Shoulder 10 is motor driven to swing the upper arm portion 18 through 180 degrees. Elbow joints 19 is also motor driven to swing forearm 20. Forearm 20 encloses a means (not shown) for causing wrist rotation at wrist 21. Appropriate means (not shown) are also contained in forearm 20 to actuate the gripping fingers 22.

Figure 2:
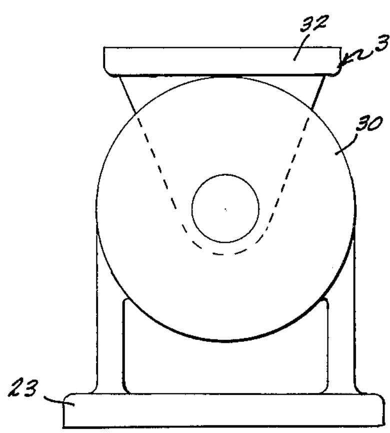
FIG. 2 is an end view of the pivoted joint or shoulder of the manipulator of FIG. 1.

Referring specifically to shoulder or pivoted joint 10 disclosed in FIGS. 1, 2, and 3, the shoulder 10 has a main frame 23 secured to the rotating unit 17 of the manipulator 11. A direct current, high-speed, low torque motor 24, for example, is mounted in a bore 25 of frame 23 and is energized from power supply 14 through wires 18 internal of the manipulator 11. The main frame 23 comprises two opposed generally parallel pivot supporting members 26 which are bored and recessed to receive the output shaft 27 and main bearings 28. Also mounted on opposite sides of frame 23 are a slip clutch housing 29 and a differential speed reducer housing 30. Housings 29 and 30 are on opposing sides of pivoted joint 10 to constitute a balanced compact design.

As mentioned hereinabove, the shoulder or pivoted joint 10 consists of a drive portion and a driven portion. The drive portion includes motor 24, slip clutch housing 29, and differential gear housing 30. The driven portion consists of pivoted member 31 which has a tilt plate 32 and a body portion 33 extending between support members 26. Linking the driven portion to the drive portion is a key 50, which causes pivoted member 31 to turn with the rotation of output shaft 27. Thus output shaft 27 passes through a transverse opening in pivoted member 31 and is the driving member for pivoted member 31.

In operation, the pivoted joint or shoulder 10 is energized by motor 24 to turn shaft 35 which drives gear 36 and meshing gear 37. The opposite faces of gear 37 are in contact with slip clutch plates 38 and 39, with clutch plate 38 secured to input shaft 40. Pressure is applied to the clutch plates 38 and 39 by tightening tension unit 51, which includes a spring portion (not shown). The application of pressure to the plates produces sufficient frictional contact between clutch plates 38, 39 and gears 37 so that rotation of gear 37 causes input shaft 40 to rotate. Input shaft 40 extends from the interior of slip clutch housing 29 through bore 41 of shaft 27, larger in diameter than said input shaft, to the interior of differential gear housing 30. Shaft 40 is supported for rotation by bearings 42. Integral with said input shaft and located within the differential gear housing is sun gear 43. Surrounding sun gear 43 is planetary gear cage 44 which contains three self-centering planetary differential gears 45 which are rotatable on axes 46 mounted on cage 44. Each planetary gear is comprised of two gear portions 45*a* and 45*b*. In FIGS. 3 and 4 output gear portion 45*a* is shown to have a smaller diameter than input gear portion 45*b*, and when driven in mesh with input and output ring gears 47 and 48 results in a speed reduction at ring gear 48. Such differential planetary gears are well known in the art and it is also known that the differential speed reduction can be accomplished by having a lesser number of teeth on one planetary gear portion than the other. Ring gear 47 is secured to the differential gear housing 30 by bolts 52. Ring gear 48, which may be termed as an output gear, is in engagement with gear portion 45*a* of planetary gears 45 and rotated thereby. A spider 49 is connected to ring gear 48 and is splined to output shaft 27 in known manner. Thus the rotation of ring gear 48 simultaneously rotates spider 49 to rotate output shaft 27.

The drive portion of the shoulder or pivotal joint 10 having been described, the driven portion will now be described.

The pivoted member 32 is secured to output shaft 27 by a key 50. Thus with motor 24 energized, the rotation of the input shaft 40 through the differential speed reducer hereindescribed results in a reduced r.p.m. at output shaft 27 to position or drive pivoted member 32 about the pivotal axis of the shoulder 10.

Referring now to FIG. 1, the energization of the motor 24 of the pivoted joint or shoulder 10 produces a pivoting action of pivoted member 32 to position upper arm 18 in relation to the rest of manipulator 11.

Thus the structure of the pivoted joint or shoulder 10 comprises a differential gear griven pivot or drive means which is capable of swinging or pivoting that portion of the manipulator connected to tilt plate 31 upon the energization of motor 24. Such motor driven pivoted joint 10 allows the upper arm, forearm, and hand to be subjected to a load with sufficient power available to lift the load from a vertical to horizontal position.

Should the load be too great for the power available at pivoted joint or shoulder 10 then the gear 37 will slip between slip clutch plates 38 and 39 to prevent damage to the differential gearing or other rotating parts.

Thus we have described a compactly arranged, differential speed reducer driven, pivoted joint provided with a slip clutch in such maner that a minimum structural bulk is provided and yet positive pivoting or swinging action is available at the driven pivoted member.

Since many variations of the exact details of construction shown in the drawings will occur to persons skilled in the art in view of the teachings of this application, it is intended that this invention should not be limited to the exact structure shown but only by the scope and spirit of the attached claims.

We claim:

1. A maniplator having a pivoted member including in combination, a frame for supporting said pivoted member, two opposed generally parallel supporting members extending from said frame, a bearing mounted on each of said supporting members, said bearings being aligned axially, said pivoted member extending between said supporting members and mounted for pivotal movement about the axis of said bearings, said pivoted member having a transverse opening therethrough coaxial with said bearings a motor drive means mounted on said frame, an output shaft mounted on said bearings and rotatable therein to constitute the axis and drive member of said pivoted member, said output shaft extending with a bore therethrough, an input shaft extending through said bore in said output shaft, a slip clutch means mounted on one end of said input shaft and driven by said motor means, a sun gear mounted on the other end of said input shaft, a differential speed reducer consisting of a plurality of differential planetary gears mounted for rotation on a differential gear frame attached to the frame of said pivoted member, said planetary differential gear comprising a first gear portion and a second gear portion, said sun gear engaging said first gear portion to cause rotation of said planetary gears, a ring gear also engaging said first portion of said planetary gears and secured to said differential gear frame, an output ring gear engageable with said second portion of said planetary gears and rotatable thereby, a spider secured to said output ring gear and rotatable thereby, said spider being secured to said output shaft to rotate said output shaft, said pivoted member secured to said output shaft and rotatable therewith whereby rotation of the pivoted member is about the axis of said output shaft.

2. A manipulator including in combination a frame member, a pivoted member, two opposed generally parallel supporting members extending from said frame, a bearing mounted on each of said supporting members, said bearings being aligned axially, said pivoted member extending between said supporting members and mounted for pivotal movement about the axis of said bearings, said pivoted member having a transverse opening therethrough coaxial with said bearings, a motor drive means, an input shaft driven by said motor drive means, said opening being adapted to receive said input shaft, a slip clutch means interposed between said motor drive means and said input shaft, a sun gear mounted on said input shaft on the opposite side of said pivoted members from said slip clutch, a plurality of planetary differential gears driven by said sun gear, a fixed ring gear for engaging a first portion of said differential planetary gears, a rotatable ring gear engageable with a second portion of said differential planetary gears and rotatable thereby, a spider means connected to said rotatable ring gear, said spider means fixedly secured to said pivoted member wherein said pivoted member is rotated by said spider, load bearing means secured to said pivoted member and movable therewith.

3. A shoulder joint for a manipulator consisting of a drive portion and a pivoted member, a supporting frame for said drive portion, two opposed generally parallel supporting members extending from said frame, a bearing mounted on each of said supporting members, said bearings being aligned axially, said pivoted member extending between said supporting members and mounted for pivotal movement about the axis of said bearings, said pivoted member having a transverse opening therethrough coaxial with said bearings a motor mounted in said supporting frame, a first housing mounted on one side of said frame, a drive means connected to said motor and contained in said first housing, a first shaft provided with a bore therethrough rotatably mounted in said frame and extending through said opening, a second shaft coaxial with said first shaft and connected to said drive means, a second housing mounted on said frame opposite from said first housing, a differential speed reducer mounted in said second housing and engageable with said second shaft to drive said first shaft and said pivoted member connected to said first shaft for movement of the pivoted member.

4. In a manipulator a motor driven pivoted joint to provide swinging relation between two portions of said manipulator with said driven pivoted joint interposed between said two portions, the combination including, a main frame secured to one portion of said manipulator, a pivoted member secured to the other portion of said manipulator, two opposed generally parallel supporting members extending from said frame, a bearing mounted on each of said supporting members, said bearings being aligned axially, said pivoted member extending between said supporting members and mounted for pivotal movement about the axis of said bearings, said pivoted member having a transverse opening therethrough coaxial with said bearings a motor means mounted in said frame, a first housing mounted on one side of said frame, a drive means connected to said motor means and contained in said first housing, said drive means including a slip clutch means, a first shaft connected to said motor means through said slip clutch means, a second shaft coaxial with said first shaft rotatably mounted in said frame and connected to said pivoted member, a second housing mounted on said frame oposite from said first housing, a differential speed reducer mounted in said housing and engageable with said first shaft to drive said second shaft, whereby the first shaft is the pivotal axis of said pivoted member, and said motor means drives said pivoted member to position said member in relation to said frame.

References Cited in the file of this patent

UNITED STATES PATENTS

| | | |
|---|---|---|
| 1,347,785 | Libby | July 27, 1920 |
| 1,724,202 | Jacobs | Aug. 13, 1929 |
| 2,027,618 | Ronning | Jan. 14, 1936 |
| 2,363,093 | Sprake | Nov. 21, 1944 |
| 2,480,212 | Baines | Aug. 30, 1949 |
| 2,691,902 | Lyons | Oct. 19, 1954 |
| 2,826,939 | Dever | Mar. 18, 1958 |

UNITED STATES PATENT OFFICE
CERTIFICATE OF CORRECTION

Patent No. 3,033,059 May 8, 1962

Donald F. Melton et al.

It is hereby certified that error appears in the above numbered patent requiring correction and that the said Letters Patent should read as corrected below.

Column 4, line 8, for "griven" read -- driven --; line 21, for "maner" read -- manner --; line 43, for "extending" read -- provided --.

Signed and sealed this 16th day of October 1962.

(SEAL)
Attest:

ERNEST W. SWIDER
Attesting Officer

DAVID L. LADD
Commissioner of Patents